Dec. 30, 1958     G. DE CHANGY     2,866,341
AUTOMATIC, SELECTIVE AND CYCLICAL CONTROL DEVICE
Filed Dec. 28, 1955     2 Sheets-Sheet 1

United States Patent Office 2,866,341
Patented Dec. 30, 1958

2,866,341
AUTOMATIC, SELECTIVE AND CYCLICAL CONTROL DEVICE
Gilbert de Changy, Clamart, France, assignor to Electricité de France-Service National-Direction des Etudes et Recherches, Paris, France Application December 28, 1955, Serial No. 555,974
Claims priority, application France December 31, 1954
1 Claim. (Cl. 74—1)

The present invention relates to an automatic, selective and cyclical device for controlling the passage by sliding motion from the operative position to the inoperative position and vice-versa of a complete series of output members such as smooth or toothed disks, rotatably driven with a continuous motion from one or more power shafts; according to the invention, the output member previously brought to its operative position returning automatically to its inoperative position before the power shaft on which it is mounted has completed a full revolution.

The device according to the present invention comprises an endless chain consisting of hingedly interconnected plates, each plate being divided into a number of lines and columns, the lines of each plate following those of the preceding plate without any discontinuity and with the same intervals, whilst the columns of all these plates are aligned in the direction of movement of the endless chain, levers registering with the columns of said plates and in same number as these columns, and teeth or tappets disposed selectively on said lines and according to the column arrangement provided on the plates, whereby each tappet may cause the aforesaid lever cooperating therewith to rock for controlling the passage from the inoperative position to the operative position of as many output members mounted on one or more power shafts as there are levers and therefore columns in the plates of the endless chain.

The attached drawings forming part of this specification illustrate diagrammatically by way of example a few forms of embodiment of this invention. In the drawings.

Figure 1:
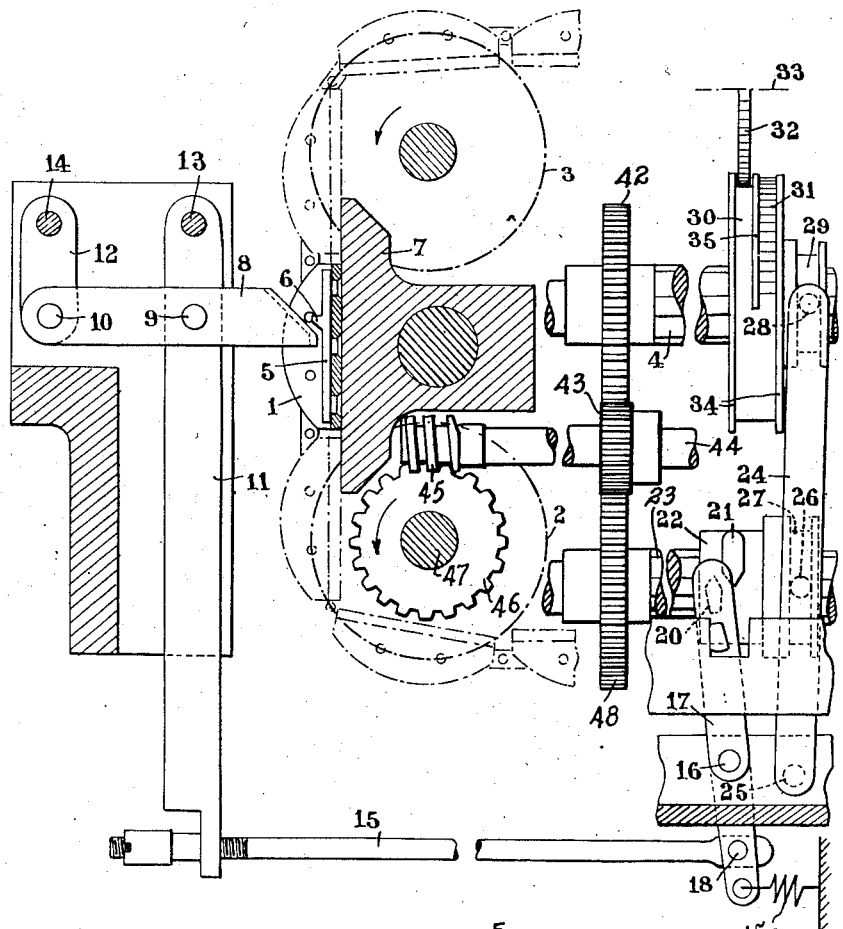
Figures 1 and 2 are part-sectional, part-elevational views showing the essential component elements of the control device in their inoperative and operative positions, respectively.
Figure 1A:
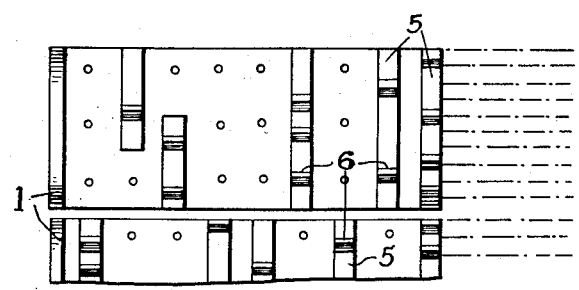
Figure 1a is a detail elevational view of an element of the control device.

The device illustrated in the drawings comprises an endless chain consisting of a pair of chains made of two series of identical links 1 passing over toothed wheels 2, 3 adapted to drive the endless chain synchronously with a splined power shaft 4. This drive is effected by means of the pinion 42 rigid with shaft 4 and meshing with pinion 43 rigid with a lay shaft 44. On this lay shaft 44 a worm 45 is formed for transmitting its rotational motion to a pinion 46 secured on the shaft 47 driving the toothed wheels 2. These link chains 1 are adapted to carry along a number of plates 5 hingedly interconnected and each formed with tappets 6 selectively distributed along regularly spaced lines and columns. The transmission ratio between the shafts 4 and 47 is so selected that to each complete revolution of the driving shaft 4 there corresponds a displacement of the endless chain which represents one interval between two successive lines.

As these plates 5 move past the bearing members 7 they are adapted to engage arms 8 pivotally connected at 9 and 10 on a lever 11 and a link 12 pivoted in turn on pins 13, 14, the pivot pins 9, 10, 13, 14 being located at the vertices of a parallelogram.

The free end of the lever 11 controls through a rod 15 the pivotal motion about a connecting pin 16 of another lever 17 having one end pivotally connected through a pivot pin 18 to the relevant end of rod 15 urged by a counter-spring 15a, the other end of the lever 17 carrying a cam-like projection 20 adapted to coact with a projection 21 provided on a disk 22 slidably mounted on, and rotatably driven from, a splined shaft 23 rotating continuously at the same speed as the power shaft 4 through the medium of pinions 42, 43 and 48, this last-mentioned pinion being rigid with the shaft 23 and of same characteristics as the pinion 42 carried by the shaft 4.

A lever 24, adapted to pivot about a pivot pin 25 carried by a stationary part of the machine on which the device is mounted, is provided with a first stud 26 engaging a grooved pulley 27 rotatably and axially fast with the disk 22, and another stud 28 engaging another grooved pulley 29 also rotatably and axially fast with disks 30, 31 slidably mounted on the splines of power shaft 4.

Figure 2:
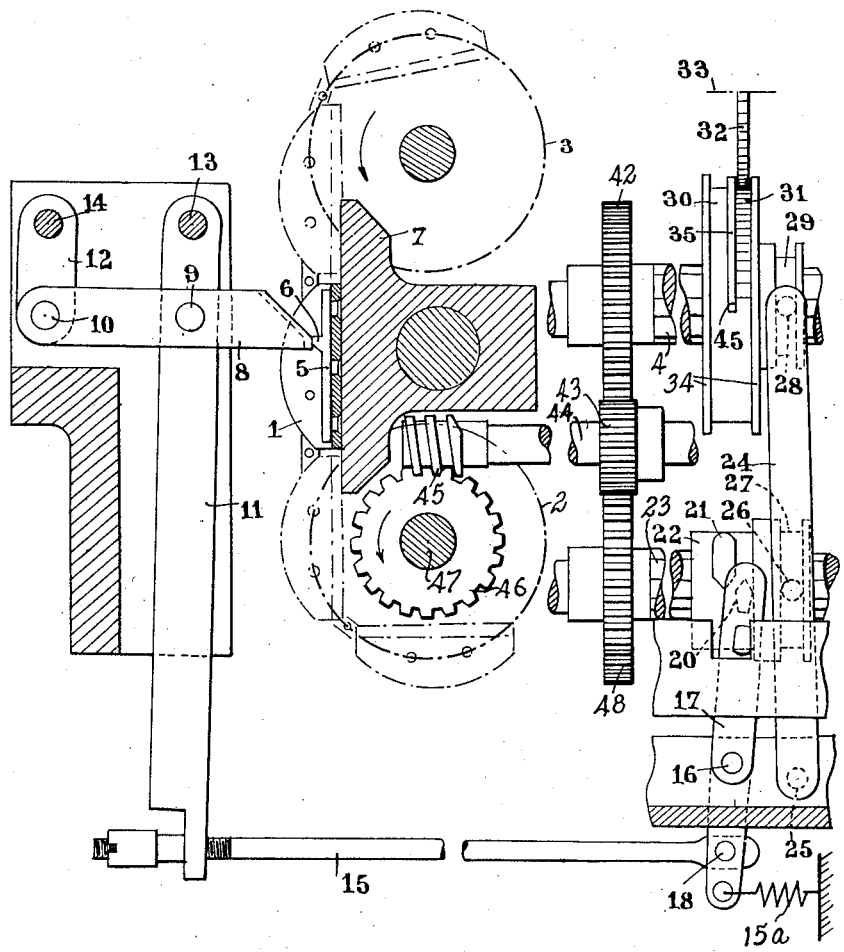

When the lever 17 is in its normal inoperative position the cam 20 is positioned on the left-hand side of the projection 21 and the disk 22 may rotate without any engagement between the projection 21 thereof and the cam 20; as a result, the lever 24 remains in its inoperative position, as well as the other disks 30, 31. On the other hand, as will be apparent from Fig. 2, when the tappet 6 has caused the arm 8 to be pushed to the left and consequently the lever 11 to rotate in a clockwise direction on the pin 13, the lever 11 will shift the rod 15 and cause in turn the lever 17 to move from its inoperative position in which it is shown in Fig. 1 to its operative position in which it is shown in Fig. 2. When the lever 17 rotates in a clockwise direction on the pin 16, the cam-like projection 20 passes on the right hand side of the projection 21 and, when the projection 21 provided on the disc 22, which is rotatably driven from the shaft 23, engages the cam-like projection 20 in the right hand position, the projection 21 is shifted to the left and the disc 22 is axially moved to the left together with the grooved pulley 27 fast therewith; as a result, this grooved pulley will carry along the stud 26 and cause the lever 24 to rock counterclockwise; thus, the stud 28 carried by this lever 24 will move the disks 30 and 31 to their operative positions.

What I claim is:

An automatic, selective and cyclical control device, comprising a power shaft, an endless chain driven in synchronism with said power shaft and made of hingedly interconnected, link-forming plates, tappets carried by said plates and selectively disposed along lines and columns on said plates, the lines of each plate extending at right angles to the direction of movement of said chain and being separated by equal distances, the last line of each plate being separated by the same distance from the first line of the adjacent plate, said columns being parallel to said chain, and a series of levers, said levers registering with said columns and being adapted to be selectively and separately shifted to their operative positions by the different tappets disposed on the registering column of the successive plates.

References Cited in the file of this patent
UNITED STATES PATENTS

| | | |
|---|---|---|
| 197,287 | Owens | Nov. 20, 1877 |
| 1,211,551 | Curtis | Jan. 9, 1917 |
| 1,811,624 | Ford | June 23, 1931 |
| 1,964,909 | Garity | July 3, 1934 |
| 2,032,037 | Auth | Feb. 25, 1936 |
| 2,110,541 | Winter et al. | Mar. 8, 1938 |
| 2,469,881 | Laubach et al. | May 10, 1949 |
| 2,473,503 | Berger et al. | June 21, 1949 |
| 2,493,738 | Cuttat | Jan. 10, 1950 |
| 2,495,462 | Lassiter | Jan. 24, 1950 |